(12) United States Patent
DeCusatis et al.

(10) Patent No.: US 9,178,943 B2
(45) Date of Patent: *Nov. 3, 2015

(54) DISJOINT MULTI-PATHING FOR A DATA CENTER NETWORK

(75) Inventors: Casimer M. DeCusatis, Poughkeepsie, NY (US); Keshav G. Kamble, Fremont, CA (US); Abhijit P. Kumbhare, San Jose, CA (US); Renato J. Recio, Austin, TX (US); Simarbir Singh, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 12 days.

This patent is subject to a terminal disclaimer.

(21) Appl. No.: 13/484,202

(22) Filed: May 30, 2012

(65) Prior Publication Data

US 2013/0223277 A1 Aug. 29, 2013

Related U.S. Application Data

(63) Continuation of application No. 13/407,658, filed on Feb. 28, 2012.

(51) Int. Cl.
*H04L 29/08* (2006.01)
*H04L 12/931* (2013.01)
*H04L 12/735* (2013.01)
*H04L 12/707* (2013.01)

(52) U.S. Cl.
CPC .......... *H04L 67/1097* (2013.01); *H04L 49/357* (2013.01); *H04L 45/1283* (2013.01); *H04L 45/24* (2013.01)

(58) Field of Classification Search
CPC .............. H04L 45/128; H04L 45/1283; H04L 45/1287; H04L 45/24
See application file for complete search history.

(56) References Cited

U.S. PATENT DOCUMENTS

| | | | |
|---|---|---|---|
| 7,349,350 B2 * | 3/2008 | Liu ............................... | 370/255 |
| 7,567,547 B2 * | 7/2009 | Mosko et al. .................. | 370/351 |
| 8,432,913 B2 * | 4/2013 | Suzuki et al. ................. | 370/392 |
| 2003/0033427 A1* | 2/2003 | Brahmaroutu ................ | 709/238 |
| 2003/0130821 A1* | 7/2003 | Anslow et al. ................ | 702/186 |
| 2005/0071482 A1* | 3/2005 | Gopisetty et al. ............. | 709/229 |
| 2006/0062199 A1* | 3/2006 | Yoshizawa .................... | 370/351 |
| 2008/0189769 A1* | 8/2008 | Casado et al. ..................... | 726/4 |

(Continued)

FOREIGN PATENT DOCUMENTS

| | | |
|---|---|---|
| WO | WO2009042919 | 4/2009 |
| WO | WO2011118586 | 9/2011 |

OTHER PUBLICATIONS

U.S. Appl. No. 13/407,658, filed Feb. 28, 2012.

(Continued)

*Primary Examiner* — Ajay Cattungal
(74) *Attorney, Agent, or Firm* — Zilka-Kotab, PC

(57) ABSTRACT

A method for determining disjoint multi-paths in a data center fabric network system, according to one embodiment, includes creating a topology of a data center fabric network system, wherein the system comprises a plurality of switches; determining paths between the plurality of switches; calculating one or more disjoint multi-paths from a source device to a destination device in the system; and writing the one or more disjoint multi-paths into a forwarding table of at least one of: the source device and a nearest shared switch to the source device.

17 Claims, 8 Drawing Sheets

(56) References Cited

U.S. PATENT DOCUMENTS

| | | | | |
|---|---|---|---|---|
| 2008/0285439 | A1* | 11/2008 | Lemoine et al. | 370/221 |
| 2011/0019539 | A1* | 1/2011 | Suzuki et al. | 370/225 |
| 2011/0261722 | A1 | 10/2011 | Awano | |
| 2011/0261825 | A1 | 10/2011 | Ichino | |
| 2011/0267954 | A1 | 11/2011 | Seetharaman et al. | |
| 2011/0267979 | A1 | 11/2011 | Suzuki et al. | |
| 2011/0286324 | A1* | 11/2011 | Bellagamba et al. | 370/219 |
| 2011/0286326 | A1 | 11/2011 | Awano | |
| 2011/0305168 | A1 | 12/2011 | Koide | |
| 2011/0310734 | A1 | 12/2011 | Mizukoshi | |
| 2012/0023231 | A1 | 1/2012 | Ueno | |
| 2013/0039214 | A1* | 2/2013 | Yedavalli et al. | 370/254 |
| 2013/0071116 | A1* | 3/2013 | Ong | 398/45 |
| 2013/0208621 | A1* | 8/2013 | Manghirmalani et al. | 370/254 |
| 2013/0223440 | A1 | 8/2013 | DeCusatis | |

OTHER PUBLICATIONS

Tavakoli et al., "Applying NOX to the Datacenter," Proc. HotNets, NY, NY, Oct. 2009, 6 pages.

Mudigonda et al., "SPAIN: Design and Algorithms for Constructing Large Data-Center Ethernets from Commodity Switches," HP Laboratories, HPL-2009-241, Oct. 8, 2009, 29 pages.

P. Vujosevic, "Investigation and validation of the OpenFlow protocol for next generation converged optical networks," Master Thesis Report, Barcelona School of Telecommunication Engineering, Jul. 2011, pp. 1-100.

Non-Final Office Action from U.S. Appl. No. 13/407,658 dated Dec. 23, 2013.

International Search Report and Written Opinion from PCT application No. PCT/IB2013/051344 dated May 28, 2013.

Recio, R., "Distributed Overlay Virtual Ethernet (DOVE) Networks," 2012 IBM Corporation, Feb. 23, 2012, pp. 1-27.

Tam et al., "Trimming the Multipath for Efficient Dynamic Routing," Sep. 5, 2011, pp. 1-9.

Final Office Action from U.S. Appl. No. 13/407,658 dated Jul. 2, 2014.

Non-Final Office Action from U.S. Appl. No. 13/407,658, dated Dec. 1, 2014.

* cited by examiner

DISJOINT MULTI-PATHING FOR A DATA CENTER NETWORK

RELATED APPLICATIONS

This application is a continuation of copending U.S. patent application Ser. No. 13/407,658, filed Feb. 28, 2012, which is herein incorporated by reference.

BACKGROUND

The present invention relates to Ethernet switches and switching, and more particularly, this invention relates to disjoint multi-pathing for a data center network.

All fabric types (e.g., networking, storage, and clustering) used in data centers make use of support for multiple redundant paths through the network that help to enable high availability of critical applications. In particular, storage traffic, e.g., traffic over Fibre Channel (FC), internet small computer system interface (iSCSI), and/or FC over Ethernet (FCoE), has traditionally used this approach to insure continuous availability of all the storage resources in a data center. Similar requirements may be found in traditional Ethernet networks or server clusters, e.g., remote direct memory access (RDMA), RDMA over converged Ethernet (RoCE), internet wide area RDMA protocol (iWarp), or other similar RDMA protocols. This requirement may be achieved by implementing more than one physically separate network, each network having redundant switches and links. A significant disadvantage of this approach is the administrative overhead associated with configuring, managing, and maintaining at least two separate networks.

This may be somewhat overcome if a single network fabric is implemented which supports multi-pathing. Such fabrics use an alternative to spanning tree protocol (STP), which forces a single path through the network and thus underutilizes network bandwidth (in the case of bridged domains, STP forces a single multi-cast tree to be available).

There are different types of multi-pathing, depending on whether the multiple paths through the network share common network devices or whether they are completely disjointed from each other. The highest levels of availability are provided by fabrics which support disjoint multi-pathing, preferably in a flat fabric architecture which facilitates virtual machine (VM) migration in highly virtualized data centers.

There are several possible approaches to support disjoint multi-pathing using open, industry standard protocols, all of which have drawbacks. For example, a single transparent interconnection of lots of links (TRILL) fabric covering the entire data center would not function properly unless enhancements to the currently available industry standards are made in order to support disjoint multi-pathing and a flat Layer 2 fabric. Further, there may be some concern as to implementation of TRILL that use proprietary type-length-value (TLV) encoding or which are not based on intermediate system to intermediate system (IS-IS). TRILL uses different paths for unicast and multicast traffic compared with shortest path bridging (SPB). For the vast majority of Internet protocol (IP) traffic, this should not make a difference. However, care should be taken for latency sensitive applications.

Other proposed standards such as SPB would use additional configuration steps to ensure that different paths are in fact fully disjoint and that the server adaptors select the correct paths to use. Further, by using either of TRILL or SPB, a method to ensure redundancy at the network interface controller (MC) or host bus adapter (HBA) and the first hop into the network would be necessary. Thus, the industry is currently lacking a mature standard-based solution to this problem.

SUMMARY

In one embodiment, a method for determining disjoint multi-paths in a data center fabric network system includes creating a topology of a data center fabric network system, wherein the system includes a plurality of switches, determining paths between the plurality of switches, calculating one or more disjoint multi-paths from a source device to a destination device in the system, and writing the one or more disjoint multi-paths into a forwarding table of at least one of: the source device and a nearest shared switch to the source device.

Other aspects and embodiments of the present invention will become apparent from the following detailed description, which, when taken in conjunction with the drawings, illustrate by way of example the principles of the invention.

DETAILED DESCRIPTION

Figure 1:
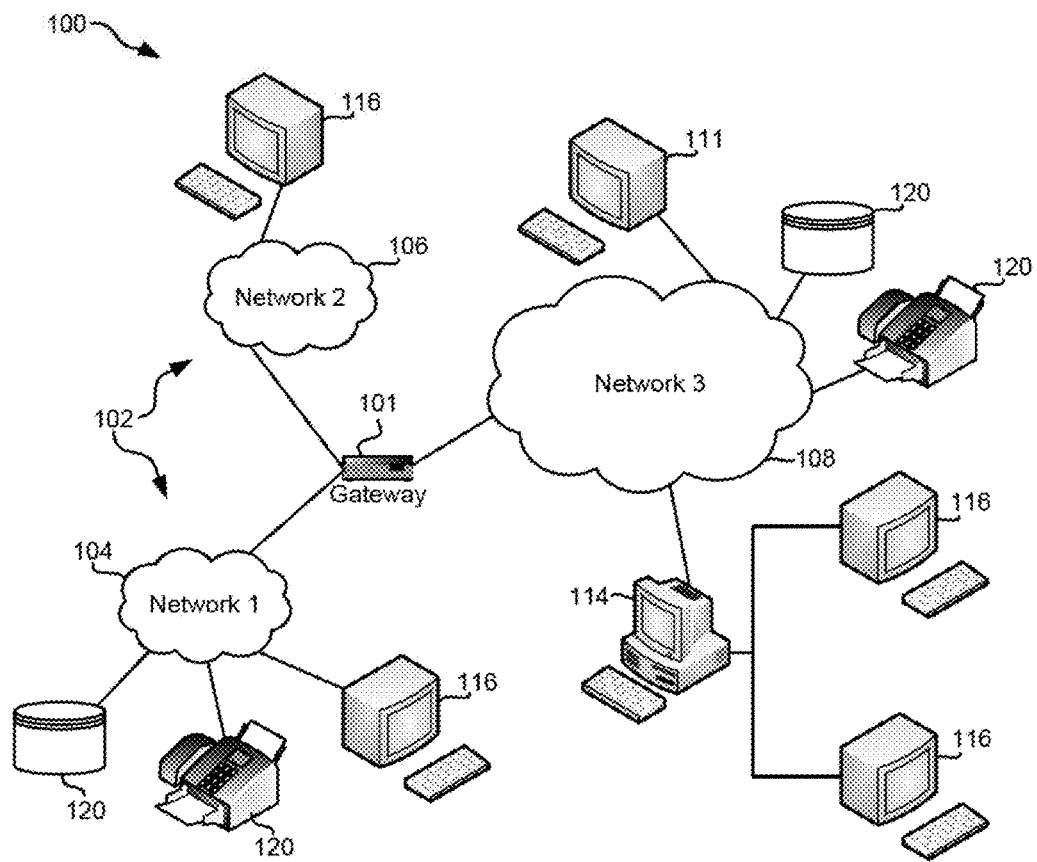
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one approach, a data center fabric using a single controller for managing the control plane, such as an OpenFlow controller, may support both shared and disjoint multi-pathing and may provide a faster time to market compared with alternative systems currently available. Accordingly, implementation of disjoint multi-pathing using OpenFlow Controllers (OFCs), or other controllers that facilitate consolidation of the control plane at a central place, may be configured to make use of novel software extensions to existing protocol, which are discussed in more detail herein.

According to one general embodiment, a data center fabric network system includes a controller, a plurality of switches connected to the controller via a plurality of communication links, a source device connected to at least a first switch of the plurality of switches, a destination device connected to at least a second switch of the plurality of switches, and wherein the controller is adapted for: creating a topology of the data center fabric network system, determining paths between the plurality of switches, calculating one or more disjoint multi-paths from the source device to the destination device based on the topology, and writing the one or more disjoint multi-paths into a forwarding table of at least one of: the source device, the first switch, and a nearest shared switch to the source device.

In another general embodiment, a computer program product includes a computer readable storage medium having computer readable program code embodied therewith, the computer readable program code including computer readable program code configured to create a topology of a data center fabric network system, wherein the system includes a plurality of switches, computer readable program code configured to determine paths between each switch and all other switches of the system, computer readable program code configured to calculate one or more disjoint multi-paths from a source device to a destination device in the system, and computer readable program code configured to write the one or more disjoint multi-paths into a forwarding table of at least one of the source device and a nearest shared switch to the source device.

In yet another general embodiment, a method for determining disjoint multi-paths in a data center fabric network system includes creating a topology of a data center fabric network system, wherein the system includes a plurality of switches, determining paths between the plurality of switches, calculating one or more disjoint multi-paths from a source device to a destination device in the system, and writing the one or more disjoint multi-paths into a forwarding table of at least one of: the source device and a nearest shared switch to the source device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
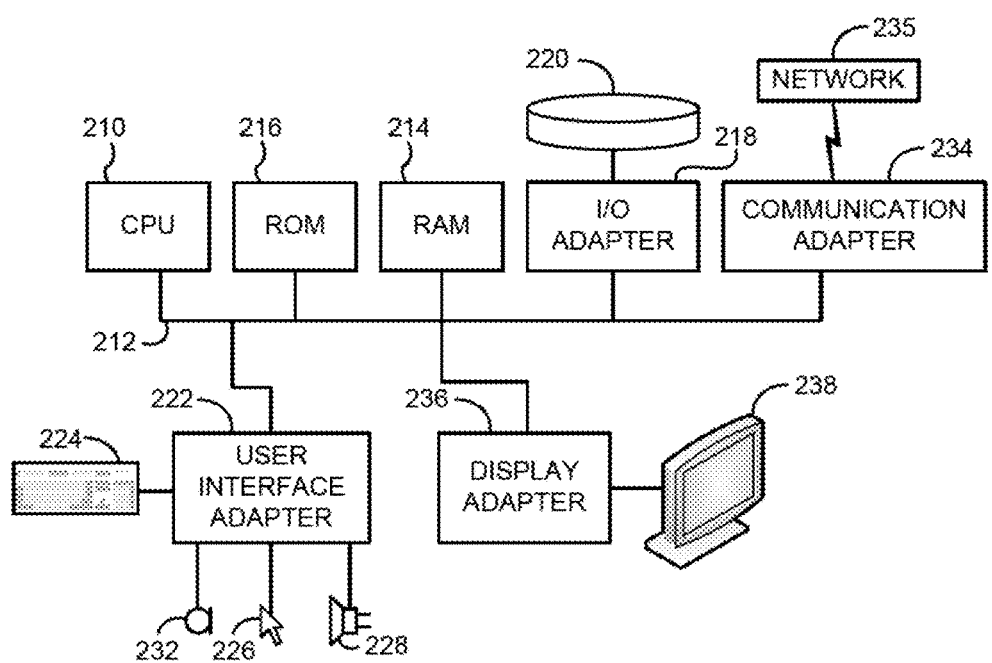
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
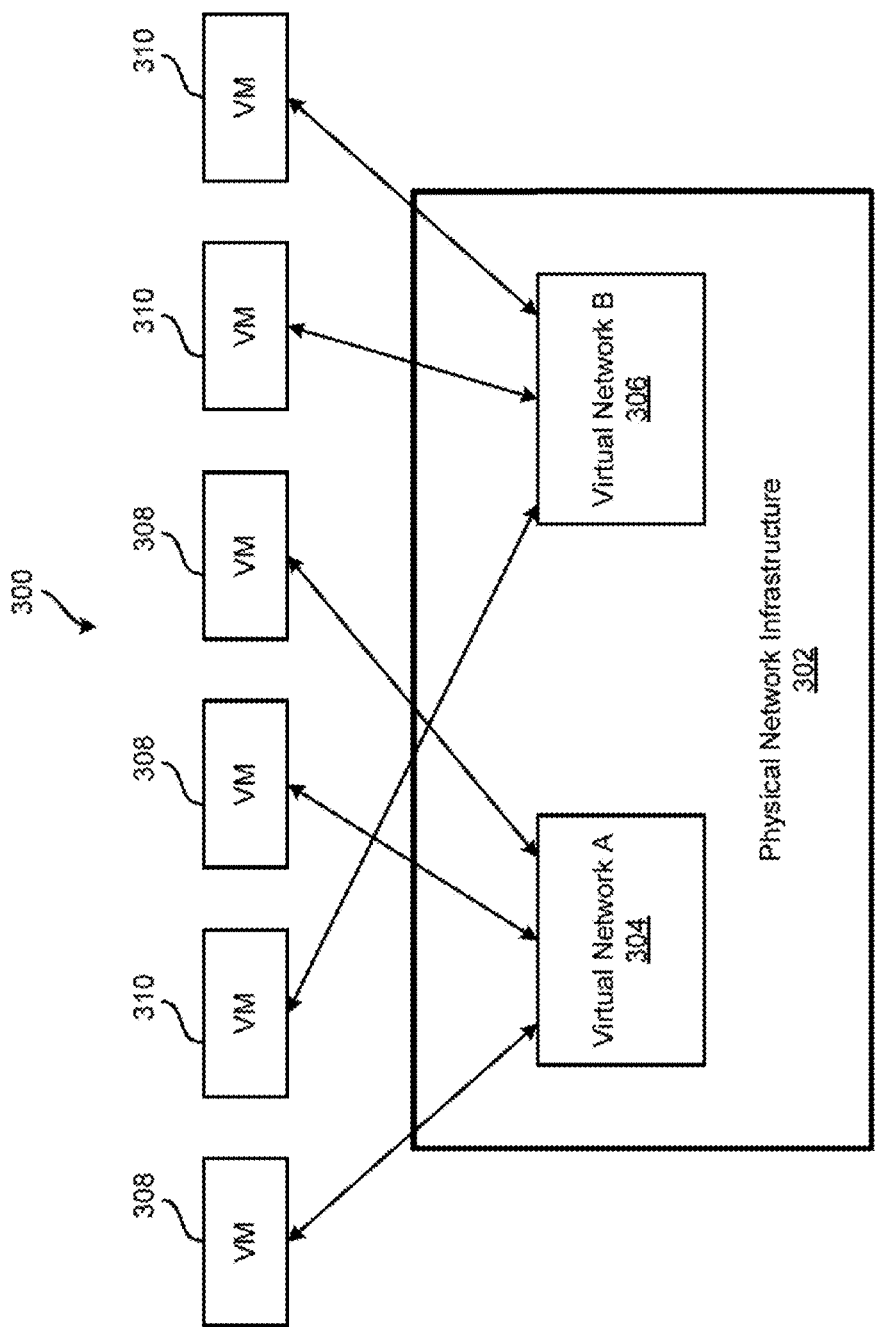
FIG. 3 is a conceptual view of an overlay network, according to one embodiment.

Referring now to FIG. 3, a conceptual view of an overlay network 300 is shown according to one embodiment. In order to virtualize network services, other than simply providing a fabric path (connectivity) between devices, an appliance cloud may be virtualized. The overlay network 300, in one approach, comprises one or more virtual networks 304, 306 within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art.

In some approaches, tunnels (not shown) may be established between virtual networks 304, 306 and/or between at least one virtual network 304, 306 and one or more VMs 310.

Each virtual network 304, 306 may include any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

Figure 4:
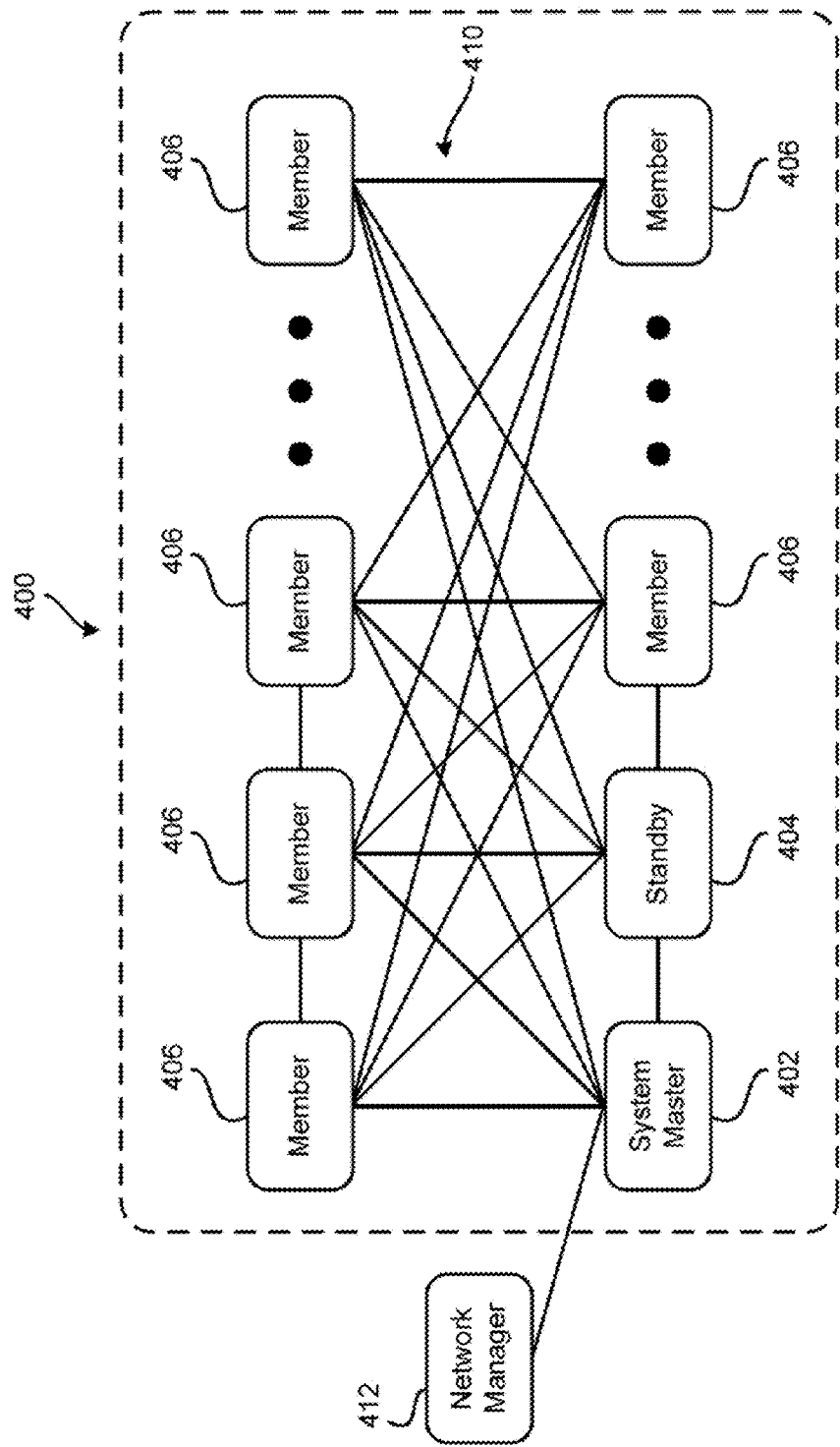
FIG. 4 is an overview of component connectivity of a cDFP and/or an eDFP, according to one embodiment.

Now referring to FIG. 4, an overview of component connectivity 410 of a cDFP and/or a eDFP (DFP 400) is shown according to one embodiment. The system master 402 is a main controller of the DFP 400. In one embodiment, no other controller may be used in the domain of the DFP 400. In alternate embodiments, other controllers (not shown) may be used to control specific or general functionality of the domain, such as switching, testing, etc., as would be known to one of skill in the art. Traffic (data/requests/alerts or the like being sent) from outside of the domain enters the DFP 400 through network manager 412.

The standby device 404 is provided in the DFP 400 so that should connectivity to the system master 402 be lost for any reason, or if the system master 402 fails for any reason, the standby device 404 is adapted to become the system master and provides all functionality of a system master.

The system master 402 is responsible for determining services used for a particular traffic flow (movement of data/ requests/alerts or the like through the DFP 400) and redirects it through a series of members 406, as appropriate based on the particular traffic flow involved, as would be understood by one of skill in the art.

In one embodiment, the topology of the DFP 400, being a cell switched Clos, provides high availability of any links/devices on the DFP 400. Connectivity details and cross-sectional bandwidth may be implementation specific and may be determined on an application specific basis, as would be understood by one of skill in the art.

From a networking perspective, the entire domain of the DFP 400 from outside may appear like an end host, where some services are being applied to traffic flows. The backplane of the topology, being a cell switched interface as described before, removes the possibility of endless looping and it efficiently uses the available backplane bandwidth by spreading cells over multiple links for a single destination, according to one embodiment. Individual members 406 may be added/removed in the domain of the DFP 400 without disrupting other services, devices, etc.

According to one embodiment, up to about 800 members may be grouped together in the DFP 400. This allows for about 32,768 Ethernet ports in a single domain of a DFP 400, in one example. In a further embodiment, with the architecture described herein according to various embodiments, constant latency of about 2.5 microseconds or less is possible along with the large number of Ethernet ports possible in one traffic management domain. In one example, the DFP 400 may be envisioned as a single switch having over 32,000 Ethernet ports.

Accordingly, in addition to integrating the plurality of Ethernet ports into the DFP 400, all of the requirements of a data center are also integrated into the DFP 400, in some embodiments. Therefore, if a new extremely low latency, flat data center is being initiated, the DFP 400 helps with virtualization, because most of the virtualized data centers, especially hypervisor-based servers, run a plurality of VMs. By having a "flat switch" architecture, the plurality of VMs may move data across the architecture easily and efficiently. It is very difficult for VMs, generally, to move across layer 3-domains, between one subnet to another subnet, internet protocol (IP) subnet to IP subnet, etc. But if the architecture is similar to a large flat switch, in a very large layer 2-domain, then the VMs are aided in their attempt to move data across the architecture.

Figure 5:
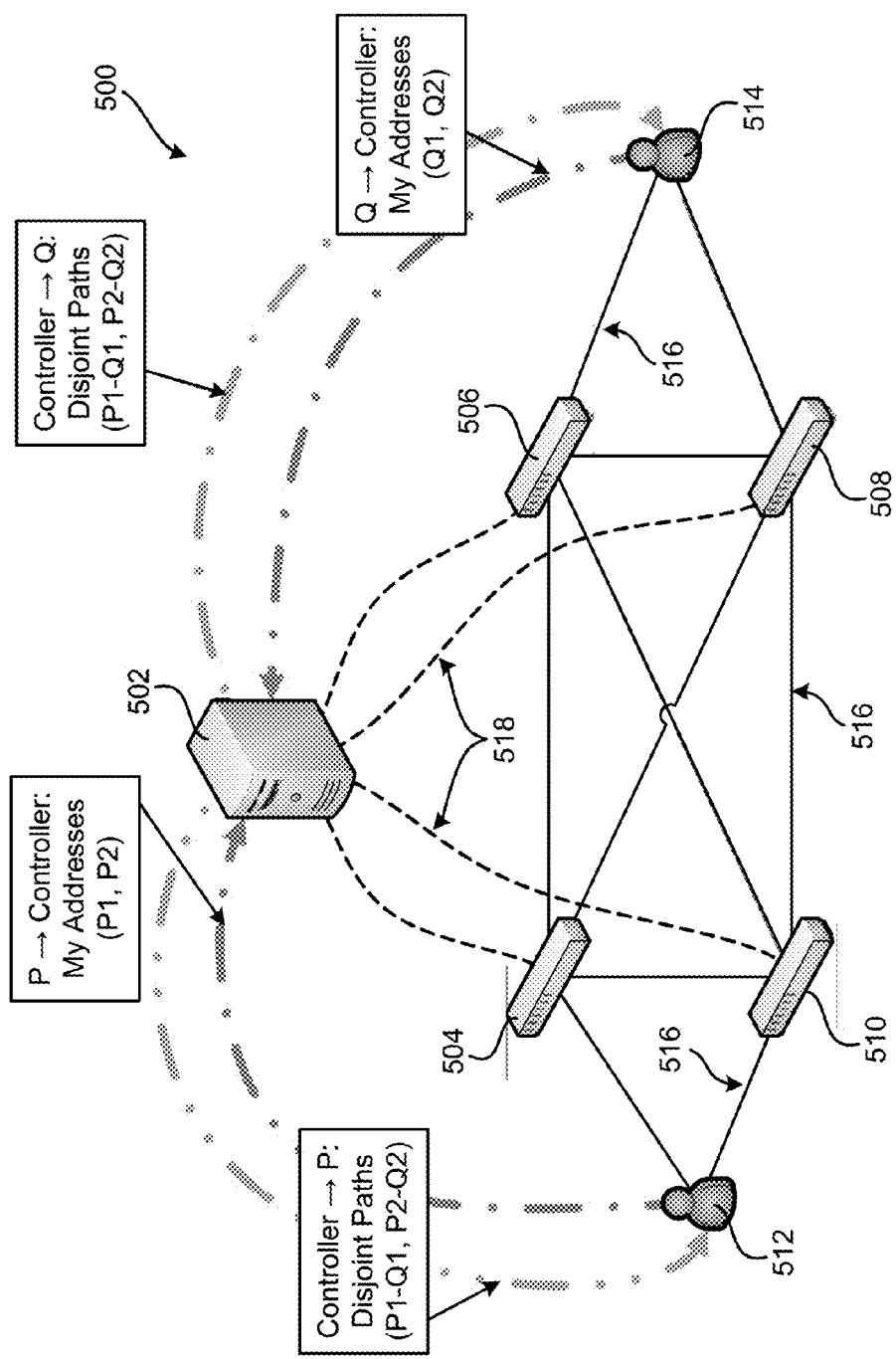
FIG. 5 is a simplified view of a data center fabric network system, according to one embodiment.

Now referring to FIG. 5, a simplified view of a data center fabric network system 500 is shown according to one embodiment. The system 500 comprises a controller 502, a plurality of switches connected to the controller 502 via a plurality of communication links 518 (in FIG. 5, four switches are shown, switches 504, 506, 508, 510; however, there is no limit as to the number of switches that may exist in the system 500, and these four switches are used for exemplary purposes only), a source device 512 connected to at least a first switch of the plurality of switches (in FIG. 5, this first switch may be either of switch 504 and switch 510), and a destination device 514 connected to at least a second switch of the plurality of switches (in FIG. 5, this may be either of switch 506 and switch 508). Of course, the particular arrangement of the switches, the source device 512, the destination device 514, and/or the controller 502 may be determined based on functionality, available resources, purpose, etc., of the network system that is being used or implemented, as would be known to one of skill in the art.

Each of the switches and devices of the system 500 may be connected to one another via connections 516, which may allow communications via Ethernet, fibre channel (FC), peripheral component interconnect (PCI), etc.

In one embodiment, the controller 502 is adapted for: creating a topology of the system 500, determining paths between all switches of the plurality of switches, calculating one or more disjoint multiple paths (multi-paths) from the source device 512 to the destination device 514 based on the topology, and writing the one or more disjoint multi-paths into a forwarding table of at least one of the source device 512, the first switch, and a nearest shared switch to the source device 512 (which in FIG. 5 may be either of switches 504 and 510).

If the source device is a switch, then the one or more disjoint multi-paths may be stored into the forwarding table of the source device 512, as it would be capable of using the information to properly forward data along the one or more disjoint paths. If not, then the one or more disjoint multi-paths may be stored into the forwarding table of switches 504 and/or 510, depending on whether one or each of switches 504, 510 are members of the disjoint path between the source device 512 and the destination device 514.

According to embodiments described herein, each of the one or more disjoint multi-paths may comprise at least two paths that are disjoint from one another resulting in at least one fully redundant path. In more embodiments, each disjoint multi-path may comprise at least two paths that are partially disjoint from one another (possibly sharing one or more elements in the paths) resulting in at least one partially redundant path (that may share one or more elements in the path).

In another approach, a control plane for each of the plurality of switches may be controlled by the controller 502, thereby reducing processing demands on each of the plurality of switches in the system 500 and centralizing control over the switching network.

As shown in FIG. 5, switch 504 is a member of a path 512-504-506-514, and switch 510 is a member of a path 512-510-508-514. These two paths comprise a disjoint multi-path between the source device 512 and the destination device 514. Of course, there may be a plurality of disjoint multi-paths between any two points in the system 500. Other such disjoint multi-paths available, even in this simplistic system, are 512-504-508-514 and 512-510-506-514, illustrating that there may be many different possible disjoint multi-paths between any two points in the system 500.

In one embodiment, the controller may be further adapted to store the determined paths to a forwarding table in each switch, thereby allowing each switch to forward data along designated paths through the system 500.

According to one embodiment, the controller 502 may be adapted to operate as an OpenFlow controller. This allows the controller 502 to operate with certain advantages over other operational systems, as explained in more detail herein. The OpenFlow controller may operate in conjunction with OpenFlow-enabled switches, such as the IBM BNT RACK-SWITCH 8264, which is a 40G switch.

In some advantageous embodiments, the plurality of switches do not themselves execute a discovery protocol to determine paths to other switches in the system 500. This frees up processing capacity for each switch, and reduces processing overheard for the entire system 500, due to the centralized nature of the path calculations being performed on the controller 502.

In another embodiment, the controller 502 may be further adapted for calculating at least one disjoint multi-path between each switch and all other switches in the system 500, and writing the at least one disjoint multi-path into a forwarding table of each switch in the system 500.

For example, for switch 504, the disjoint multi-paths to destination device 514 are 504-506-514 and 504-508-514.

These disjoint multi-paths may be stored to the forwarding table for this switch, such that this switch is capable of directing traffic on disjoint paths whenever applicable, as would be known to one of skill in the art. Then, the same calculations are carried out for all other switches in the system 500, and the disjoint multi-paths are stored to a forwarding table for each switch in the system 500, thereby allowing each switch to forward traffic on disjoint paths whenever applicable.

In another embodiment, the controller 502 may be further adapted for detecting a change in the system 500 (such as the addition of a switch to the system 500, the removal of a switch from the system 500, change of a property of a switch in the system 500, etc.), re-calculating at least one disjoint multi-path between each switch and all other switches in the system 500 in response to the change in the system 500, and writing the at least one disjoint multi-path into a forwarding table of each switch.

According to some embodiments, the controller 502 may be further adapted for: detecting a change in the system 500 affecting a disjoint multi-path between the source device 512 and a destination device 514, re-calculating one or more disjoint multi-paths from the source device 512 to the destination device 514 in response to the change in the system 500, and writing the one or more re-calculated disjoint multi-paths into the forwarding table of at least one of: the source device 512, the nearest shared switch to the source device 512, and the first switch, as discussed previously.

According to more approaches, the one or more disjoint multi-paths from the source device 512 to the destination device 514 may be calculated in response to a request from the source device 512 or the nearest shared switch to the source device 512. This request may be initiated due to data intending to be sent from the source device 512 to somewhere in the system 500.

Figure 6:
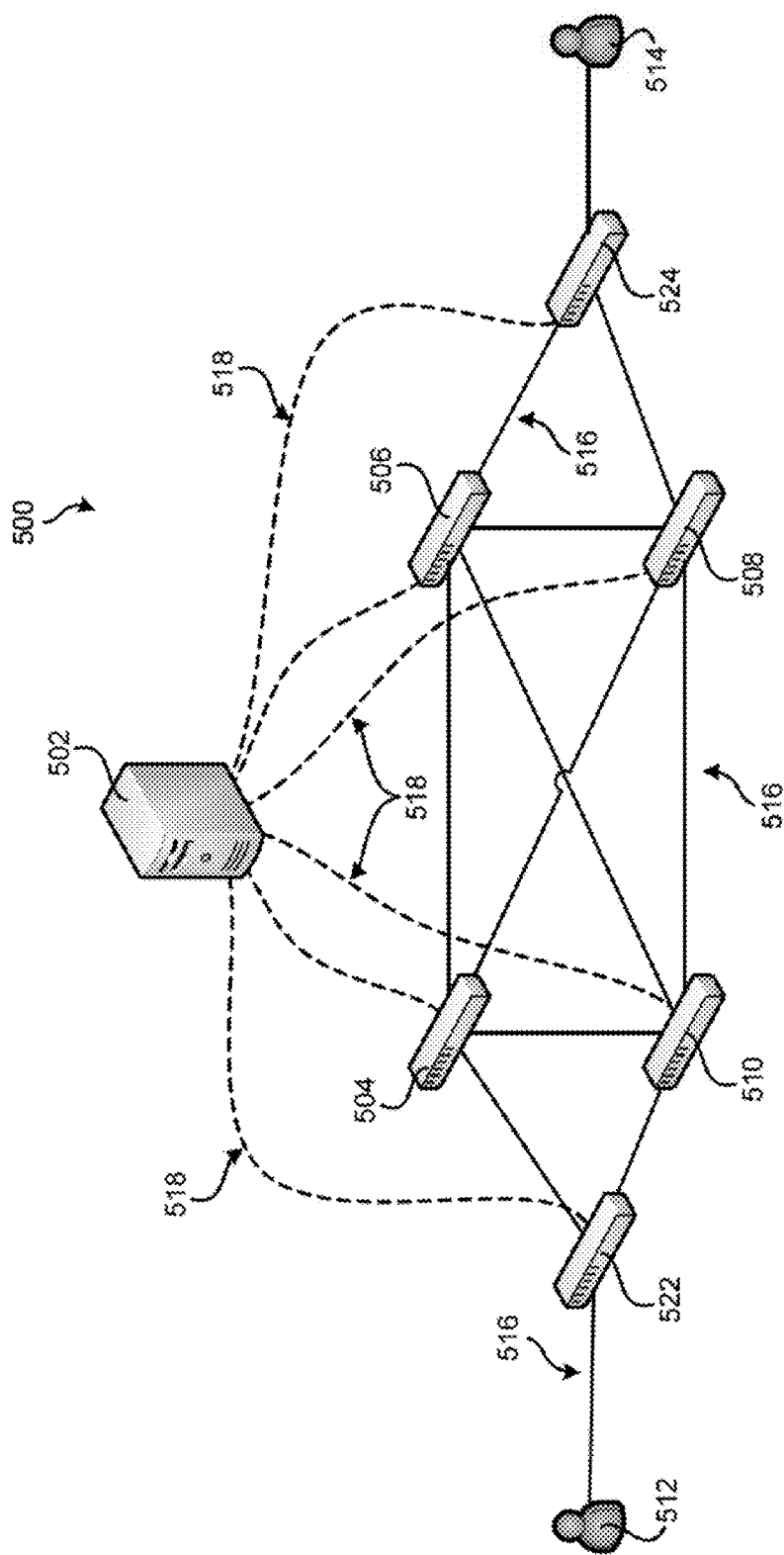
FIG. 6 is a schematic diagram of a fabric network having partially disjoint paths, according to one embodiment.

As shown in FIG. 6, a fabric network 500 may comprise partially disjoint paths through the plurality of switches. For example, disjoint paths from the source device 512 to the destination device 514 may include several of switches 504, 506, 508, and/or 510. However, each path from the source device 512 to the destination device 514 must include switch 522 nearest to the source device 512, and switch 524 nearest to the destination device 514. Accordingly, since these switches 522, 524 are shared across more than one path, the paths are not fully disjoint, but instead are referred to as partially disjoint paths. One such partially disjoint multi-path from the source device 512 to the destination device 514 includes 522-504-506-524 and 522-510-508-524. Note that 522 and 524 are included in each path, thereby rendering the paths not fully disjoint. In cases where the controller 502 is not capable of calculating fully disjoint multi-paths, it will calculate and return partially disjoint multi-paths, according to some embodiments.

Referring now to FIGS. 5-6, in order to accomplish the centralized control over each of the plurality of switches in the system 500, when the controller 502 is an OpenFlow controller, additional software may be used to enable functions in the network. In order to support disjoint multi-pathing as described herein, the following features are provided by the system 500.

First, each switch in the fabric network 500 is connected to an out of band management network. In some preferred embodiments, an OpenFlow controller 502 is connected to the switches over a secure communication link 518, using switches which support OpenFlow protocols. This implementation is relatively easy, since many data center networks currently make use of inexpensive, relatively low data rate (1 Gbit/s) Ethernet outband networks for management of more expensive switch infrastructures.

Second, all switches in the fabric network 500 are instructed by the OpenFlow controller 502 to turn off Layer 2 forwarding standards, such as STP, etc. Third, all switches in the fabric network 500 enable reporting of their nearest adjacent neighbors to the OpenFlow controller 502.

Under these conditions, in some embodiments, it becomes possible for the OpenFlow controller 502 to calculate the topology of the fabric network 500 and then load appropriate forwarding tables into the switches. The OpenFlow controller 502 may contain a topology manager and may be capable of network topology discovery (similar to the IS-IS and "hello" protocols used by TRILL and other competing approaches). Through extensions of the link layer discovery protocol (LLDP) and protocol data units (PDUs), the OpenFlow controller 502 may create a topology map of the network 500. The controller 502 then calculates possible paths through the network 500, which are communicated to OpenFlow enabled switches as forwarding table entries in each switch.

The OpenFlow controller 502 may calculate disjoint multi-paths from a given source 512 to a given destination 514 (depending on the size of the network 500 and speed of the calculation, there are several alternative embodiments; for example, the controller 502 may calculate all possible disjoint multi-paths upon initialization of the network 500, it may only calculate paths from a specific source to a specific destination upon receiving a request from a server, etc.). The disjoint multi-paths may be calculated using various algorithms, as known in the art.

For example, the controller 502 may begin the calculation with one initial path and search all other possible paths in a serial fashion, discarding those which share a common element with the initial path. Alternately, using a multi-thread processor, the controller 502 may begin with one initial path and search other possible paths in parallel to identify those paths which have a first switch in common with the initial path, a second switch in common with the initial path, etc., until the only remaining paths have no elements in common with the initial path (are disjoint of one another). Of course, other variations would be apparent to those skilled in the art, such as graph theory algorithms for calculating paths through a network.

The resulting disjoint multi-paths are then written into the forwarding tables of the switches. In the event a switch is added, removed, or changed in the fabric network 500, this calculation of the topology map and disjoint multi-paths may be repeated, and a new set of forwarding tables may be written to the switches by the OpenFlow controller 502. It is expected that reconvergence times will be faster under these conditions when compared with alternative solutions, since the recalculation is centralized in the OpenFlow controller 502 rather than being distributed across each switch in the network 500.

Note that since topology discovery is enabled directly from OpenFlow, in some approaches, the switches do not run other discovery protocols such as MSTP, TRILL, etc. This is an advantage of using the centralized controller 502 for topology discovery.

All Ethernet address resolution protocols (ARPs) and fibre channel over Ethernet interne protocol (HP) requests are routed to the OpenFlow controller 502, with request for disjoint multi-pathing support as requested. If disjoint multi-pathing is requested (for example, through a server element manager interface, such as TIVOLI interfacing to the Open-Flow controller 502, an enhancement to ARP which requests disjoint multi-pathing, etc.), the OpenFlow controller 502 may select appropriate disjoint paths through the network.

Thus, the OpenFlow controller 502 may also include a mechanism for detecting that a given physical server is requesting disjoint multi-pathing as described above. The OpenFlow controller 502 may also include a mechanism for setting up disjoint paths through the appropriate flow tables in the switches, and a mechanism for responding to the server's request for disjoint paths. In this manner, a single network fabric with one management interface may be created which supports multi-pathing features that were formerly available only through management of multiple separate networks.

There are several alternative embodiments presented below. For example, while this approach describes a centralized OpenFlow control plane, it is also possible for the OpenFlow control plane to be distributed, or to be shared among redundant OpenFlow controllers (two or more controllers) attached to the network (subject to any limitations of the OpenFlow protocol). In another embodiment, the OpenFlow controller may not be restricted to equal cost or shortest-hop multi-path calculations; instead, multiple paths (disjoint or not) may be calculated using some other basis (for example, multiple paths with significantly different path lengths may be used). Alternatives such as TRILL and SPB do not support this option in their multi-path calculations.

In order for the server to place appropriate traffic onto the disjoint multi-paths through the network, this traffic is directed to appropriate ports of the server network adapter (NIC) or host bus adapter (HBA). Today, the OpenFlow specification mainly addresses the control plane rather than the network management functions. Most servers provide at least two physical connections which are multi-homed to the network. The server port may be mapped to the first network switch through a new interface within the network element manager or with the management plane in a Software Defined Network (SDN) implementation. One possible implementation may be that the host requesting disjoint multi-paths advertises to the controller the address of the two physical connections. The controller in turn indicates to the host the disjoint multi-paths.

This is represented in FIG. 5, where the source device 512 (P) requests the disjoint multi-paths from the controller 502 by indicating its own ports (P→Controller: My addresses (P1, P2)). In response, the controller 502 indicates the disjoint multi-paths to the source device 512 (Controller→P: Disjoint Paths (P1-Q1, P2-Q2)).

Conversely, if the destination device 514 (Q) requests disjoint multi-paths from the controller 502, the same actions may be taken. For example, the destination device 514 (Q) may request the disjoint multi-paths from the controller 502 by indicating its own ports (Q→Controller: My addresses (Q1, Q2)). In response, the controller 502 indicates the disjoint multi-paths to the destination device 514 (Controller→Q: Disjoint Paths (P1-Q1, P2-Q2)).

In the case where a virtual switch provides multiple data paths from the hypervisor to virtual NICs or HBAs, the virtual switch may participate in the OpenFlow controller topology discovery.

Note that all other Layer 2 routing in the network 500 (such as TRILL and SPB) is disabled. OpenFlow allows the potential to route traffic and compute topology maps based on Layer 2, Layer 3, or a combination of both parameters. If a preferred embodiment uses only Layer 2 features for OpenFlow topology discovery and routing, the resulting calculations will be transparent to other network protocols which rely exclusively on Layer 3, such as Distributed Overlay Virtual Ethernet (DOVE). This is an advantage, since DOVE (or similar Layer 3 variants such as VXLAN) use equal cost multi-pathing and have mechanisms to isolate multi-tenant traffic, but do not provide the control required to insure disjoint multi-pathing.

In another embodiment, the OpenFlow controller may interact with DOVE to enhance its performance. For example, DOVE may treat OpenFlow as another lower level network option and run on top of OpenFlow. When a DOVE switch queries the learning service for the location of a VM, the learning service (or the DOVE switch) may, at the same time, make a request to the OpenFlow controller to implement a disjoint multi-path. Another addition would be the ability of DOVE to request that the OpenFlow controller set a path for certain traffic flows so that they go through a firewall, some other security appliance, a traffic conditioning device, etc. (the learning service may make this request). In this case, OpenFlow may be enhanced to inspect deeper into the packets and choose a path based on inner headers, rather than on the encapsulated headers, as not all traffic between two DOVE switches have the same security policy or other such requirements.

Figure 7:
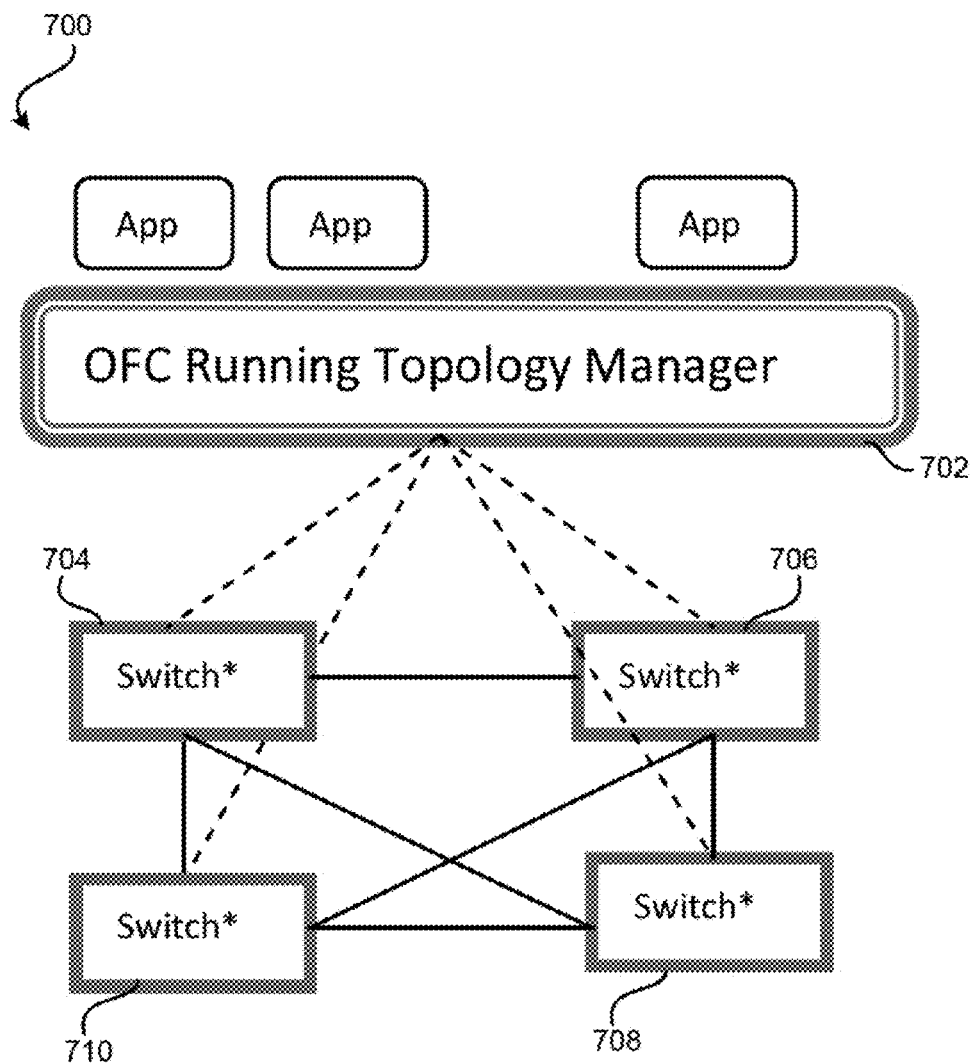
FIG. 7 is a flowchart of a method, according to one embodiment.

Now referring to FIG. 7, a flow chart of a method is shown according to one embodiment. The topology manager in the controller 702 creates a topology map for the data plane switches 704, 706, 708, 710, such as by using LLDP PDUs. Then, the controller 702 calculates disjoint multi-paths through the network 700 and reports it to the switch which requested the disjoint multi-paths, or to all switches 704, 706, 708, 710 based on their location in the network 700. The resulting disjoint multi-paths are then written into the forwarding tables of the switches 704, 706, 708, 710. Addition or removal of switches, or changes (such as link states) to any switches in the network 700 leads to re-discovery of new disjoint multi-paths through the network 700.

Figure 8:
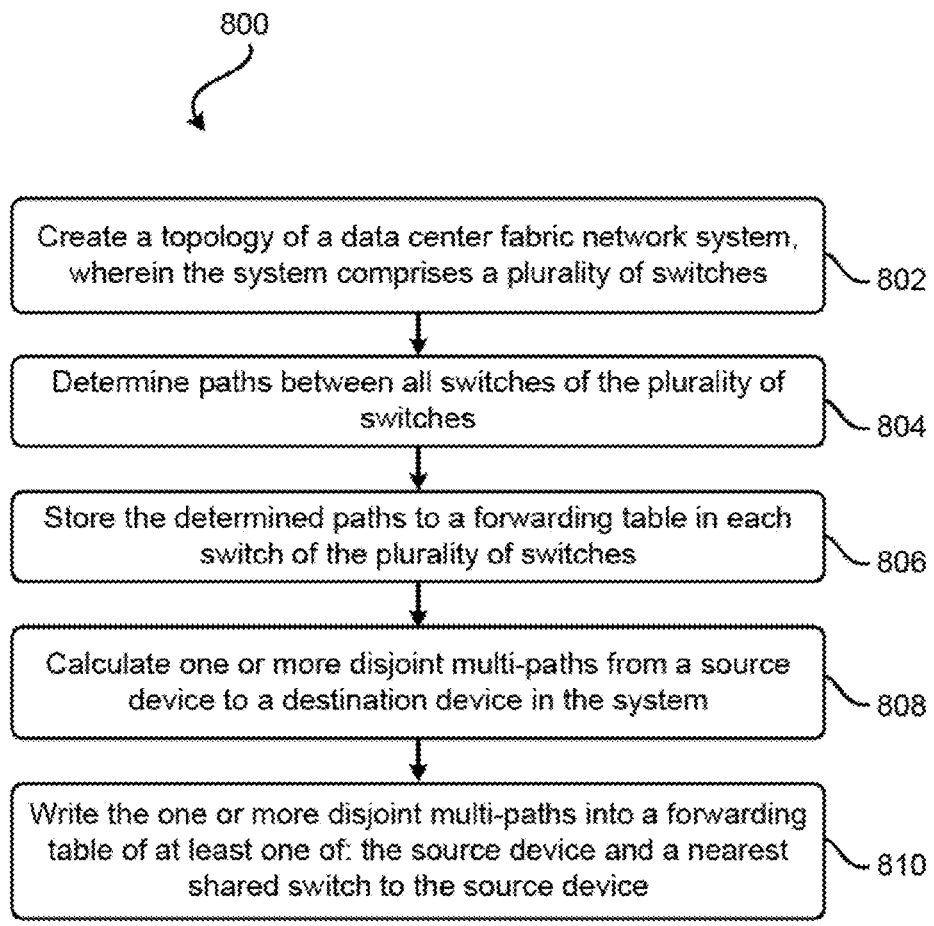
FIG. 8 is a flowchart of a method, according to one embodiment.

Now referring to FIG. 8, a flowchart of a method 800 is shown, according to one embodiment. The method 800 may be performed in accordance with the present invention in any of the environments depicted in FIGS. 1-7, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in one embodiment, the method 800 may be partially or entirely performed by the controller, in one approach, as described herein in more detail.

Optional operations described below are those operations which may be omitted, or may be performed once while other operations are performed multiple tunes, or may be performed by other entities are systems and relied upon by other operations, according to various embodiments.

As shown in FIG. 8, method 800 may initiate with optional operation 802, where a topology of a data center fabric network system is created. The system comprises a plurality of switches that form the network through which data may be sent or received.

In operation 804, paths are determined between all switches of the plurality of switches, thereby allowing discovery of paths through the network.

In optional operation 806, the determined paths are stored to a forwarding table in each switch of the plurality of switches. This allows the switches to forward data to the appropriate ports.

In operation 808, one or more disjoint multi-paths are calculated from a source device to a destination device in the system. The source device and/or the destination device may be a switch, a host, a server, etc. Also, the one or more disjoint multi-paths may be fully or partially disjoint, depending on the topology of the network.

In operation 810, the one or more disjoint multi-paths are written into a forwarding table of at least one of the source device and a nearest shared switch to the source device.

In one approach, the plurality of switches do not themselves execute a discovery protocol to determine paths to other switches in the system.

In one embodiment, the method 800 may further comprise calculating at least one disjoint multi-path between each switch and all other switches in the system and writing the at least one disjoint multi-path into a forwarding table of each switch. This may be performed at initialization of the network, according to preferred approaches. In this way, when a request to send data over disjoint paths is received, no further calculations are necessary to report the disjoint paths, as they are already calculated.

In further approaches, the method 800 may include detecting a change in the system, re-calculating at least one disjoint multi-path between each switch and all other switches in the system in response to the change in the system, and writing the at least one disjoint multi-path into a forwarding table of each switch. In some approaches, the change in the system may comprise one of addition of a switch to the system, removal of a switch from the system, and change of a property of a switch in the system. This is applicable to the forwarding table of each switch in the network.

In a further embodiment, the method 800 may include detecting a change in the system affecting a disjoint multi-path between the source device and a destination device, re-calculating one or more disjoint multi-paths from the source device to the destination device in response to the change in the system, and writing the one or more re-calculated disjoint multi-paths into the forwarding table of at least one of: the source device and the nearest shared switch to the source device. This is applicable to when only a calculation has been performed in response to a request for disjoint multi-paths.

For example, in one approach, the one or more disjoint multi-paths from the source device to the destination device may be calculated in response to a request from the source device or the nearest shared switch to the source device.

In one embodiment, each of the one or more disjoint multi-paths may comprise at least two paths that are disjoint from one another resulting in at least one fully redundant path.

In another approach, a control plane for each of the plurality of switches may be controlled by a controller of the system, which may be adapted to operate as an OpenFlow controller.

Of course, any aspect of the method 800 may be executed as a computer program product.

For example, in one embodiment, a computer program product may comprise a computer readable storage medium having computer readable program code embodied therewith. The computer readable program code may comprise computer readable program code configured to create a topology of a data center fabric network system, wherein the system comprises a plurality of switches; computer readable program code configured to determine paths between each switch and all other switches of the system; computer readable program code configured to calculate one or more disjoint multi-paths from a source device to a destination device in the system; and computer readable program code configured to write the one or more disjoint multi-paths into a forwarding table of at least one of: the source device and a nearest shared switch to the source device.

Of course, any of the other previously described embodiments and/or approaches may be implemented in the computer program product, as would be understood by one of skill in the art upon reading the present descriptions.

While various embodiments have been described above, it should be understood that they have been presented by way of example only, and not limitation.

Thus, the breadth and scope of an embodiment of the present invention should not be limited by any of the above-described exemplary embodiments, but should be defined only in accordance with the following claims and their equivalents.

What is claimed is:

1. A method for determining disjoint multi-paths in a data center fabric network system, the method comprising:
   creating a topology of a data center fabric network system using a switch controller, wherein the data center fabric network system comprises a plurality of switches and the switch controller coupled directly to the plurality of switches via secure communication links, the plurality of switches being restricted from executing a discovery protocol to determine paths to other switches in the data center fabric network system;
   determining paths between the plurality of switches using path calculations performed by the switch controller;
   calculating one or more disjoint multi-paths from a source device to a destination device using the switch controller based on the topology, the calculating comprising determining whether a fully disjoint multi-path is available from the source device to the destination device, the calculated one or more disjoint multi-paths being fully disjoint based on a determination that a fully disjoint multi-path is available from the source device to the destination device and being partially disjoint based on a determination that a fully disjoint multi-path is not available from the source device to the destination device;
   writing, using the switch controller, the one or more disjoint multi-paths into a forwarding table of the source device, the source device being configured to communicate with the switch controller during the writing of the one or more disjoint multi-paths into the forwarding table; and
   writing, using the switch controller, the one or more disjoint multi-paths into a switch forwarding table of a nearest shared switch to the source device so that all traffic sent from the source device is routed through the nearest shared switch.

2. The method as recited in claim 1, further comprising storing the determined paths to a switch forwarding table in each switch in the determined paths of the plurality of switches.

3. The method as recited in claim 1, further comprising:
   calculating, using the switch controller, at least one disjoint multi-path between each switch and all other switches in the system; and
   writing the at least one disjoint multi-path into a switch forwarding table of each switch using the switch controller.

4. The method as recited in claim 3, further comprising:
   detecting a change in the system using the switch controller;
   re-calculating at least one disjoint multi-path between each switch and all other switches in the system in response to the change in the system, the re-calculating comprising determining whether a fully disjoint multi-path is available from the source device to the destination device, the calculated at least one disjoint multi-path being fully disjoint based on a determination that a fully disjoint multi-path is available from the source device to the destination device and being partially disjoint based on a determination that a fully disjoint multi-path is not available from the source device to the destination device; and writing the at least one disjoint multi-path into the switch forwarding table of each switch using the switch controller, wherein the change in the system comprises one of: addition of a switch to the system, removal of a switch from the system, and change of a property of a switch in the system.

5. The method as recited in claim 4, wherein the change in the system comprises change of a property of a switch in the system.

6. The method as recited in claim 1, further comprising:
detecting a change in the system affecting a disjoint multi-path between the source device and a destination device using the switch controller;

re-calculating one or more disjoint multi-paths from the source device to the destination device in response to the change in the system, the re-calculating comprising determining whether a fully disjoint multi-path is available from the source device to the destination device, the calculated one or more disjoint multi-paths being fully disjoint based on a determination that a fully disjoint multi-path is available from the source device to the destination device and being partially disjoint based on a determination that a fully disjoint multi-path is not available from the source device to the destination device; and writing, using the switch controller, the one or more re-calculated disjoint multi-paths into the forwarding table of at least one of: the source device and the nearest shared switch to the source device, wherein the change in the system comprises one of: addition of a switch to the system, removal of a switch from the system, and change of a property of a switch in the system.

7. The method as recited in claim 6, wherein the change in the system comprises change of a property of a switch in the system.

8. The method as recited in claim 1, wherein the one or more disjoint multi-paths from the source device to the destination device are calculated in response to a request from the source device or the nearest shared switch to the source device.

9. The method as recited in claim 1, wherein each of the one or more disjoint multi-paths comprise at least two paths that are disjoint from one another resulting in at least one fully redundant path, and wherein a partially disjoint multi-path comprises at least two paths that share a minimum number of devices in the system.

10. The method as recited in claim 1, wherein a control plane for each of the plurality of switches is controlled by the switch controller.

11. The method as recited in claim 10, wherein the switch controller is adapted to operate as an OpenFlow controller.

12. The method as recited in claim 1, wherein the switch controller determines the paths between the plurality of switches.

13. A method for determining disjoint multi-paths in a data center fabric network system, the method comprising:
receiving, at a switch controller, reports of nearest neighbor devices from each of a plurality of switches in a data center fabric network system;

creating a topology of the data center fabric network system using the switch controller, wherein the data center fabric network system comprises the plurality of switches and the switch controller coupled directly to the plurality of switches via secure communication links, the plurality of switches being restricted from executing a discovery protocol to determine paths to other switches in the system;

determining paths between the plurality of switches, provided that the plurality of switches do not themselves execute a discovery protocol to determine paths to other switches in the system;

storing the determined paths, using the switch controller, to a switch forwarding table in each switch of the plurality of switches;

calculating one or more disjoint multi-paths from a source device to a destination device in the system using the switch controller, wherein each of the one or more disjoint multi-paths comprise at least two paths that are disjoint from one another to as great of an extent as possible given the topology of the data center fabric network system resulting in at least one fully redundant path between the source device and the destination device; and writing, using the switch controller, the one or more disjoint multi-paths into at least a forwarding table of a nearest shared switch to the source device that is part of at least one disjoint multi-path.

14. The method as recited in claim 13, further comprising:
calculating at least one disjoint multi-path between each switch and all other switches in the system; and
writing the at least one disjoint multi-path into a switch forwarding table of each switch.

15. The method as recited in claim 14, further comprising:
detecting a change in the system;
re-calculating at least one disjoint multi-path between each switch and all other switches in the system in response to the change in the system; and
writing the at least one disjoint multi-path into the switch forwarding table of each switch,
wherein the change in the system comprises one of: addition of a switch to the system, removal of a switch from the system, and change of a property of a switch in the system.

16. The method as recited in claim 13, further comprising:
detecting a change in the system affecting a disjoint multi-path between the source device and a destination device;
re-calculating one or more disjoint multi-paths from the source device to the destination device in response to the change in the system; and
writing the one or more re-calculated disjoint multi-paths into the forwarding table of at least one of: the source device and the nearest shared switch to the source device,
wherein the change in the system comprises one of: addition of a switch to the system, removal of a switch from the system, and change of a property of a switch in the system.

17. The method as recited in claim 13, wherein the one or more disjoint multi-paths from the source device to the destination device are calculated in response to a request from the source device and/or the nearest shared switch to the source device being received by the switch controller.

* * * * *